United States Patent [19]

Petrillo

[11] 4,347,664
[45] Sep. 7, 1982

[54] SOIL PIPE CUTTER

[76] Inventor: Felix A. Petrillo, 1143 Stowe Ave., McKees Rocks, Pa. 15136

[21] Appl. No.: 178,698

[22] Filed: Aug. 18, 1980

[51] Int. Cl.³ .................. B23D 21/10; B23B 5/14
[52] U.S. Cl. ................................... 30/97; 82/4 C
[58] Field of Search ............... 30/97, 96, 98; 82/4 C

[56] References Cited

U.S. PATENT DOCUMENTS

| 2,097,358 | 10/1937 | Whittaker | 30/97 |
| 2,679,686 | 6/1954 | Ingwer et al. | 30/97 |
| 2,716,530 | 8/1955 | Lowe et al. | 30/97 X |
| 3,431,646 | 3/1969 | Young | 30/97 |
| 4,185,525 | 1/1980 | Sherer | 30/97 X |
| 4,206,664 | 6/1980 | Miyagawa | 82/4 C |

FOREIGN PATENT DOCUMENTS 966292  4/1975  Canada ..................... 30/93
52-36388  3/1977  Japan ..................... 82/4 C Primary Examiner—Frank T. Yost
Attorney, Agent, or Firm—William J. Ruano

[57] ABSTRACT

A pipe cutter especially adapted to cut soil pipes and the like from the outside in a very narrowly confined space.

The soil pipe of a bathroom commode projects outwardly from the wall and is capped a short distance from the wall. The present cutter is mounted on the existing mounting bolts of the soil pipe assembly. The cutter assembly comprises an input shaft which may be driven by a separate electric drill which turns a pinion geared to a ring gear, driving it at slower speed, the latter having mounted, on the inner perimeter, a spring-loaded cutter blade for projecting the blade radially inwardly under spring action during rotation of cutter blade.

1 Claim, 4 Drawing Figures

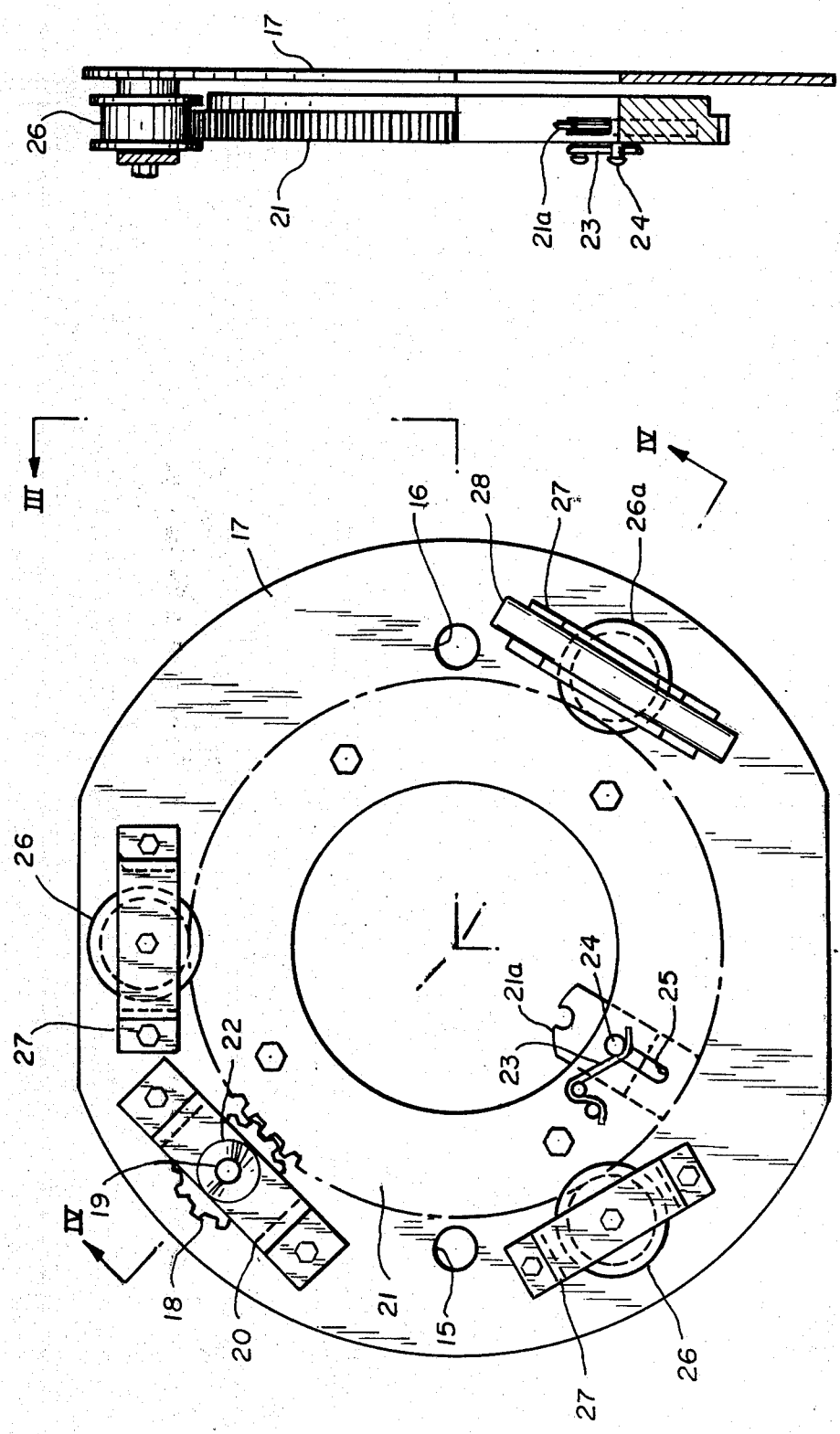

SOIL PIPE CUTTER

This invention relates to a cutter particularly adapted for cutting soil pipes externally.

An outstanding disadvantage of conventionally used cutters for soil pipes and the like is that they require considerable space for leverage action of the operating lever for effecting cutting.

In the conventional soil pipe installation for bathroom commodes, very little space is provided surrounding the soil pipe to enable operation by a conventional cutter. And even if space permits, no convenient way for mounting the cutter is available to obtain proper dimension from wall.

An object of the present invention is to overcome the above named disadvantages.

A more specific object of the invention is to provide a novel soil pipe cutter which can be mounted on a conventional soil pipe mounting assembly and which can operate within the very confined space that exists surrounding the projecting and capped soil pipe extending from the wall.

A still further object is to provide a cutter mounting which will ensure a clean cut by the continuous spring loading of the cutter blade while the cutter blade is rotating around the outer surface of the portion of the pipe to be cut.

Other objects and advantages of the invention will become more apparent from a study of the following description taken with accompanying drawings wherein;

FIG. 2 is a front or elevational view of a cutter assembly involving the present invention and which is mounted on the structure as shown in FIG. 1;

FIG. 3 is a cross-sectional view taken along line III—III of FIG. 2; and

Figure 4:
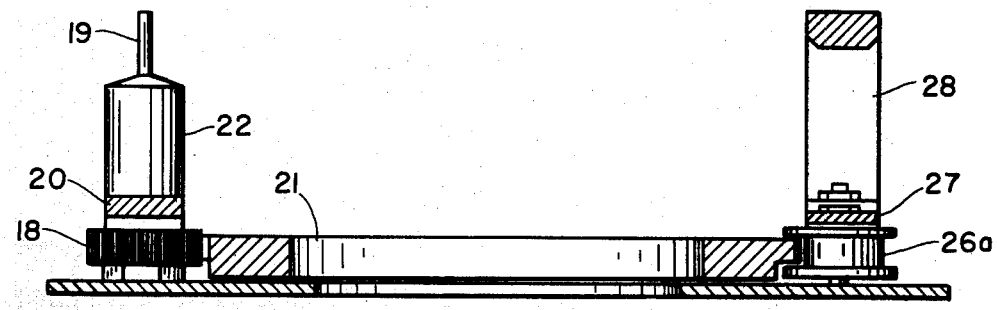
FIG. 4 is a cross-sectional view taken along line IV—IV of FIG. 2.
Figure 1:
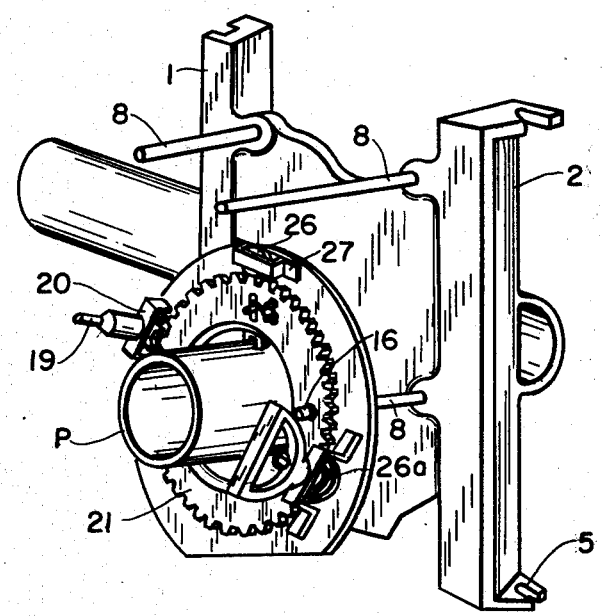
FIG. 1 is a perspective view of a soil pipe mounting as found in bathrooms for a commode.

Referring more particularly in FIG. 1, numeral 1 and 2 denote two stationary supports which are supported on the floor and held rigidly thereon by bolts (not shown) extending through slots 5. A mounting assembly has four bolts 8, which normally project beyond the wall of the bathroom.

Soil pipe P is normally capped by a cemented or glued on test cap (not shown). The structure thus far described is conventional and per se forms no part of the present invention.

FIGS. 1, 2, 3 and 4 show, generally, a cutter assembly for mounting on the structure shown in FIG. 1 so that the lower two of the existing mounting bolts 8 of FIG. 1 can perform a dual function of also supporting the cutter assembly. More specifically, holes 15, and 16 of the backer plate 17 are slipped onto bolts 8 and then held flush to the wall. At this time, the cutter assembly, shown in FIG. 1 will be located outside the bathroom wall. A pinion or drive gear 18 is mounted on a stud shaft 19 which fits into shims 20. Three idler rolls 26 properly space ring gear 21 from the backer plate 17.

An electric drill (not shown) is used to drive the chuck or fitting 22 so as to rotate pinion gear 18.

A ring gear 21 is driven by gear 18 at reduced speed compared to that of gear 18 and with it rotates a spring biased cutter blade 21a that is biased radially inwardly by leaf spring 23 while guided by pin 24 along slot 25. The cutter is rounded on the leading edge to pre-determine depth of cut and cutting action takes place slightly off center of the cutting blade as such cutting blade is rotating with gear 21 in a clockwise direction, as viewed in FIG. 2. Gear 21 is mounted and centered by idlers 26, fastened by brackets and machine screws to the backer plate 17.

In operation, after the cutter assembly shown in FIG. 2 is mounted on bolts (not shown) of FIG. 1 and firmly held against the existing wall, an electric drill is used to drive gear 18 which, in turn, drives gear 21 and in so doing rotates the cutter blade 21a on the outer periphery of the soil pipe 12 closely adjacent to the wall, say about 5/16 inch from the outer wall surface. During the cutting action, leaf spring 23 continuously urges the cutter blade 21a radially inwardly to compensate for any off-center mounting backer plate 17 and the soil pipe 12 and insures a smooth and clean cut of the pipe from the outer surface thereof. If pipe is not severed evenly, the rounded leading edge of the blade retracts the blade on the uncut portion of the pipe thus lifting blade to continue cutting the uncut section of the pipe until completely severed.

While the cutter is useful for cutting plastic soil pipes, it may also be used to cut cast-iron or other metallac soil pipes or other pipes projecting from a wall surface where the cutting area is very confined.

Thus, it will be seen that I have provided an efficient soil pipe cutter for cutting a capped soil pipe from the outer perimeter thereof in extremely confined areas by mounting bolts, thereby speeding up the time required for cutting the soil pipe and greatly decreasing installation costs and at the same time assuring a clean, smooth cut surface which is parallel with the wall surface.

I claim:

1. In a capped soil pipe mounting assembly having four horizontally extending bolts extending through a bathroom wall or the like, the combination of a pipe cutter comprising a substantially circular mounting plate having a pair of holes through which the lower two of said bolts extend and having mounted on one side thereof a ring gear, idler rollers equidistantly spaced for rotatably mounting said gear, a pipe cutting blade, and a driving pinion in meshing relationship with said ring gear and having a stud shaft which is driven by an electric portable drill so as to rotate said ring gear at a slower speed than said driving pinion, whereby upon rotation of said ring gear, said cutting blade will cut through said soil pipe externally of said wall, a pin extending from said cutting blade, said ring gear having a radially extending longitudinal slot through which extends said pin, and a leaf spring normally biasing said pin and blade radially inwardly of said ring gear, said cutting blade also having a convex shaped cutting surface having a central groove.

* * * * *